(12) United States Patent
Sivasankaran et al.

(10) Patent No.: US 7,453,825 B1
(45) Date of Patent: Nov. 18, 2008

(54) APPARATUS AND METHODS FOR POINT-TO-POINT LINKS IN ROBUST NETWORKS

(75) Inventors: Dileep Sivasankaran, Fremont, CA (US); Frank S. Madren, Los Gatos, CA (US); Robert E. Novak, Santa Clara, CA (US)

(73) Assignee: Garrettcom, Inc., Fremont, CA (US)

( * ) Notice: Subject to any disclaimer, the term of this patent is extended or adjusted under 35 U.S.C. 154(b) by 653 days.

(21) Appl. No.: 11/011,413

(22) Filed: Dec. 13, 2004

(51) Int. Cl.
*H04L 12/28* (2006.01)

(52) U.S. Cl. .................. 370/255; 370/216; 709/239; 709/242

(58) Field of Classification Search ......... 370/216–218, 370/254–256, 401, 408, 255, 221, 392; 709/224–226, 709/232, 239, 242; 455/445, 426.2, 560
See application file for complete search history.

(56) References Cited

U.S. PATENT DOCUMENTS

| | | | |
|---|---|---|---|
| 6,757,258 B1 | 6/2004 | Pillay-Esnault | |
| 6,760,860 B1 | 7/2004 | Fong et al. | |
| 6,882,630 B1* | 4/2005 | Seaman | 370/256 |
| 2001/0021177 A1* | 9/2001 | Ishii | 370/256 |
| 2003/0112810 A1* | 6/2003 | Nakabayashi et al. | 370/401 |
| 2003/0161275 A1* | 8/2003 | Malhotra et al. | 370/256 |
| 2004/0062209 A1* | 4/2004 | Goldman et al. | 370/256 |
| 2005/0063396 A1* | 3/2005 | Yu | 370/401 |
| 2005/0192013 A1* | 9/2005 | Perrot et al. | 455/445 |
| 2006/0120279 A1* | 6/2006 | Mitsumori | 370/218 |

OTHER PUBLICATIONS 802.1D, IEEE Standard For Local And Metropolitan Area Networks Media Access Control (MAC) Brudges, IEEE, Jun. 2004, (Cover, Contents, pp. 145, 201-215).*
Understanding Spanning-Tree Protocol, pp. 1-8 [retrieved on Sep. 3, 2003]; Retrieved from the internet: URL//:http://www.cisco.com/univercd/cc/td/doc/product/rtmgmt/sw_ntman/cwsimain/cwsi2/cwsi . . . .
Understanding Rapid Spanning Tree Protocol (802.1w), pp. 1-15 [retrieved on Sep. 3, 2003]; Retrieved from the internet: URL//:http://www.cisco.com/warp/public/473/146.html.
Understanding Spanning-Tree Protocol Topology Changes, pp. 1-8 [retrieved on Sep. 3, 2003]; Retrieved from the internet: URL//:http://www.cisco.com/warp/public/473/17.html.

* cited by examiner

*Primary Examiner*—Aung S Moe
*Assistant Examiner*—Habte Mered
(74) *Attorney, Agent, or Firm*—Okamotot & Benedicto LLP (57) ABSTRACT

One embodiment disclosed relates to a method of operating a network switch to provide wireless redundancy in a network. A keep-alive control packet is periodically transmitting over a wireless link, wherein the keep-alive control packet has a destination MAC address being that of the other switch on the other side of the wireless link, and wherein the keep-alive control packet is specifically designated to be identified as a keep-alive type packet. The specific designation may be implemented by having a source MAC address comprising a predetermined reserved MAC address. A key portion of one embodiment is the detection of the nearest neighbor in a point-to-point connection without confusion with another device elsewhere in the network. Other embodiments are also disclosed.

10 Claims, 11 Drawing Sheets

APPARATUS AND METHODS FOR POINT-TO-POINT LINKS IN ROBUST NETWORKS

RELATED APPLICATION

The present application is related to U.S. patent application Ser. No. 10/678,977, entitled "LAN Switch with Rapid Fault Recovery," filed on Oct. 3, 2003 by Dileep Sivanasankaran, Frank S. Madren, and Peter R. Wood, the disclosure of which is hereby incorporated by reference.

BACKGROUND OF THE INVENTION

1. Field of the Invention

The present invention relates generally to computer networking.

2. Description of the Background Art

Wireless networking devices are becoming more prevalently used. For example, wireless access points are commonly connected to a wired Ethernet local area network (LAN) to extend the reach of the wired LAN. These wireless access points may be configured under the IEEE 802.11 standard to provide connectivity to wireless stations falling within the coverage area of the access points.

Improvements to networking technology is highly desirable. More particularly, it is desired to improve the functionality and use of wireless networking devices in relation to robust networks having redundant network topologies.

SUMMARY

One embodiment of the invention pertains to a method of operating an Ethernet device to provide wireless redundancy in a network. Advantageously, a keep-alive control packet is periodically transmitted over a point-to-point link, wherein the keep-alive control packet has a destination address of the other Ethernet device directly connected to the other side of the point-to-point link, and wherein the keep-alive control packet is specifically designated to be identified as a keep-alive type packet. The specific designation may be implemented by having a source address comprising a predetermined reserved address. The point-to-point link may comprise a wireless link. The point-to-point link may alternatively comprise a dial-up connection that is switched over the Public Switched Telephone Network (PSTN). Other examples of point-to-point links may include PPPoE links that are established across DSL connections or other shared ATM connections. Point-to-point links can also include VPN connections that "tunnel" a secure connection through other shared facilities. The inventive functionality discussed in the present application may be implemented for such point-to-point links.

Another embodiment of the invention pertains to a point-to-point link configured as part of a network ring topology. The point-to-point link may include first and second network Ethernet devices and a point-to-point connection communicatively connecting them. Each of the devices of the point-to-point link is configured to detect whether a link to another Ethernet device of the ring is down. This detection may be implemented, for example, by way of a link-loss-learn technique. Each of the devices of the point-to-point link is further configured, upon detection of the down link to another similar network device, to flush its routing table, learn new routes, and send a "teaching packet" that teaches a route across the point-to-point link.

A key portion of one embodiment of the invention is the detection of the nearest neighbor in a point-to-point connection without confusion with another device elsewhere in the network.

Other embodiments are also disclosed.

DETAILED DESCRIPTION

Figure 1A:
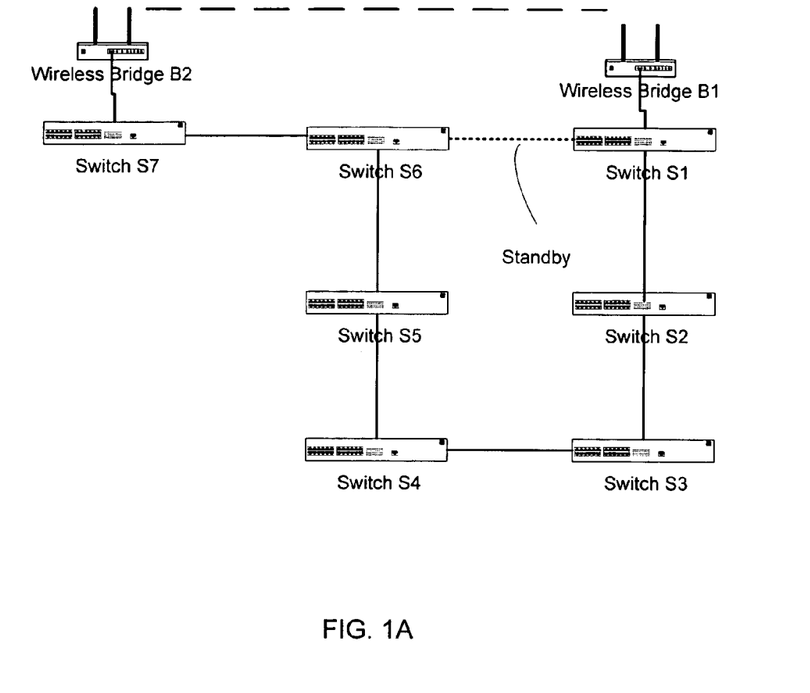
FIGS. 1A and 1B are diagrams depicting a network with a wireless link for redundancy in accordance with an embodiment of the invention.
Figure 1B:
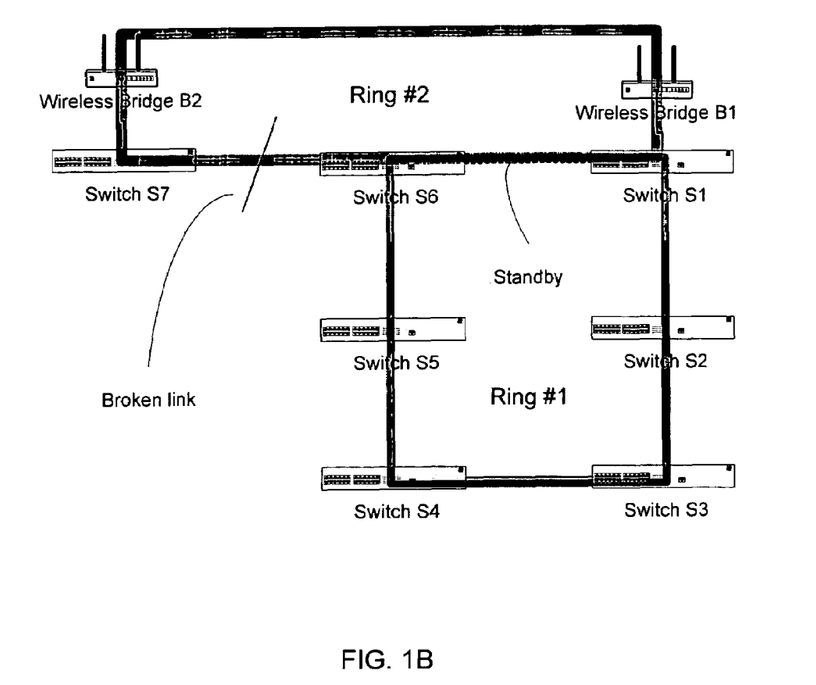

FIGS. 1A and 1B are diagrams depicting a network with a wireless link for redundancy in accordance with an embodiment of the invention. As shown in FIG. 1A, the example network includes seven network switches S1 through S7. Switches S1 through S6 are shown interconnected in a ring topology using wired links. In this example, the link between switches S1 and S6 is in a standby state to prevent looping.

Also, in this example, switch S7 branches off from switch S6. Furthermore, a wireless bridge device B1 is connected to switch S1, and a wireless bridge device B2 is connected to switch S7. A wireless link is formed between these two bridge devices B1 and B2.

A situation or circumstances may exist where one of the links between two of the switches is broken or down. For example, as illustrated in FIG. 1B, the wired link between switch S6 and switch S7 may be broken or down. In that case, switch S7 would no longer be reachable by way of the link from switch S6. An embodiment of the present invention enables a wireless link, such as the one between switch S1 and switch S7, to be used for purposes of redundancy with rapid responsiveness. As depicted in FIG. 1B, there is effectively two rings (Ring #1 and Ring #2) in the topology.

First, it is desired to avoid the "warm-up" time that it typically takes for a wireless link to be brought up to an operational state. Normally, a wireless link may be allowed to timeout after a period of inactivity. Bringing the wireless link back-up typically involves a negotiation process that may take several minutes. This type of warm-up time can occur for other types of links (for example, dial-up modems) that may time out and disconnect if there is no activity after a certain period of time. These connections also have a start-up delay to dial the phone number and to have the modems at each end perform speed and protocol handshakes prior to establishing a link.

Figure 2:
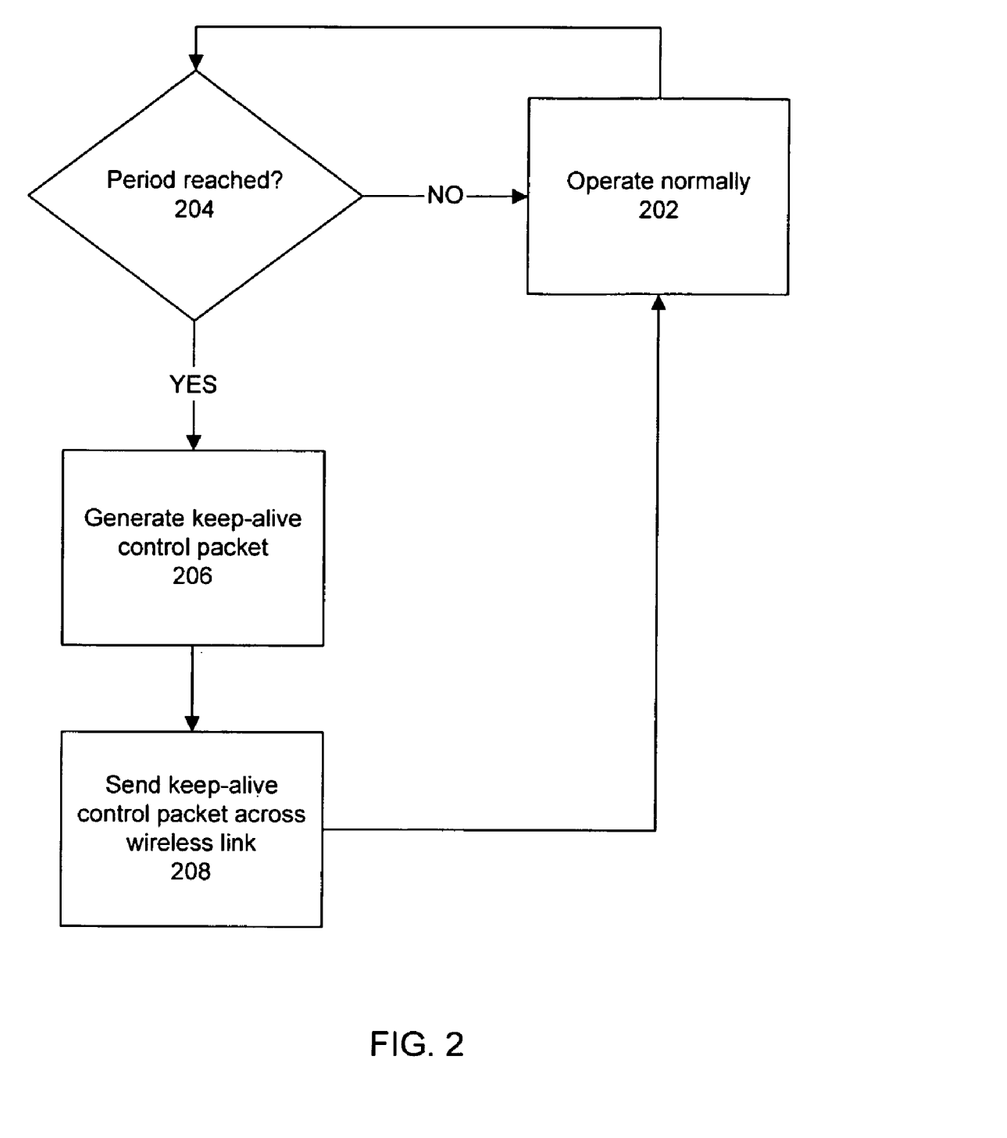
FIG. 2 is a flow chart depicting a method of maintaining a wireless link in accordance with an embodiment of the invention.

However, in accordance with an embodiment of the invention, a method of continuously maintaining a wireless link to circumvent such timeouts is depicted in the flow chart of FIG. 2. A switch unit S may be advantageously configured to perform the method such that the wireless link may be maintained continuously even while using conventional wireless bridge units B that are configured to normally timeout. Alternatively, the method may be implemented in a wireless bridge unit B.

The unit operates normally (202), but when a periodic interval is reached (204), then a keep-alive control packet is generated (206). The keep-alive control packet is then sent (208) across the wireless link. The keep-alive control packet may be transmitted at a periodicity about equal to or more frequent than a time resolution at which faults in the wireless links are discoverable. For example, the keep-alive packets may be transmitted at a periodicity of every 100 milliseconds or more frequently than that. Alternatively, in order to avoid traffic loading, the keep-alive control packets may be less frequently, but often enough to keep the radio link set up and avoid going through a tear-down of the radio link.

In a preferred embodiment, the keep-alive control packet has a destination MAC address being that of the switch unit immediately across the wireless link and is specifically designated to be identified as a keep-alive packet. The specific designation may be implemented, for example, by the keep-alive packet having a source address that is a predetermined reserved MAC address. In other words, the keep-alive packet may comprise a protocol data unit (PDU) with a pre-specified source address. An example of a PDU with a pre-specified source is a Garrettcom PDU (GPDU). A GPDU is described below in relation to FIG. 7.

Figure 3:
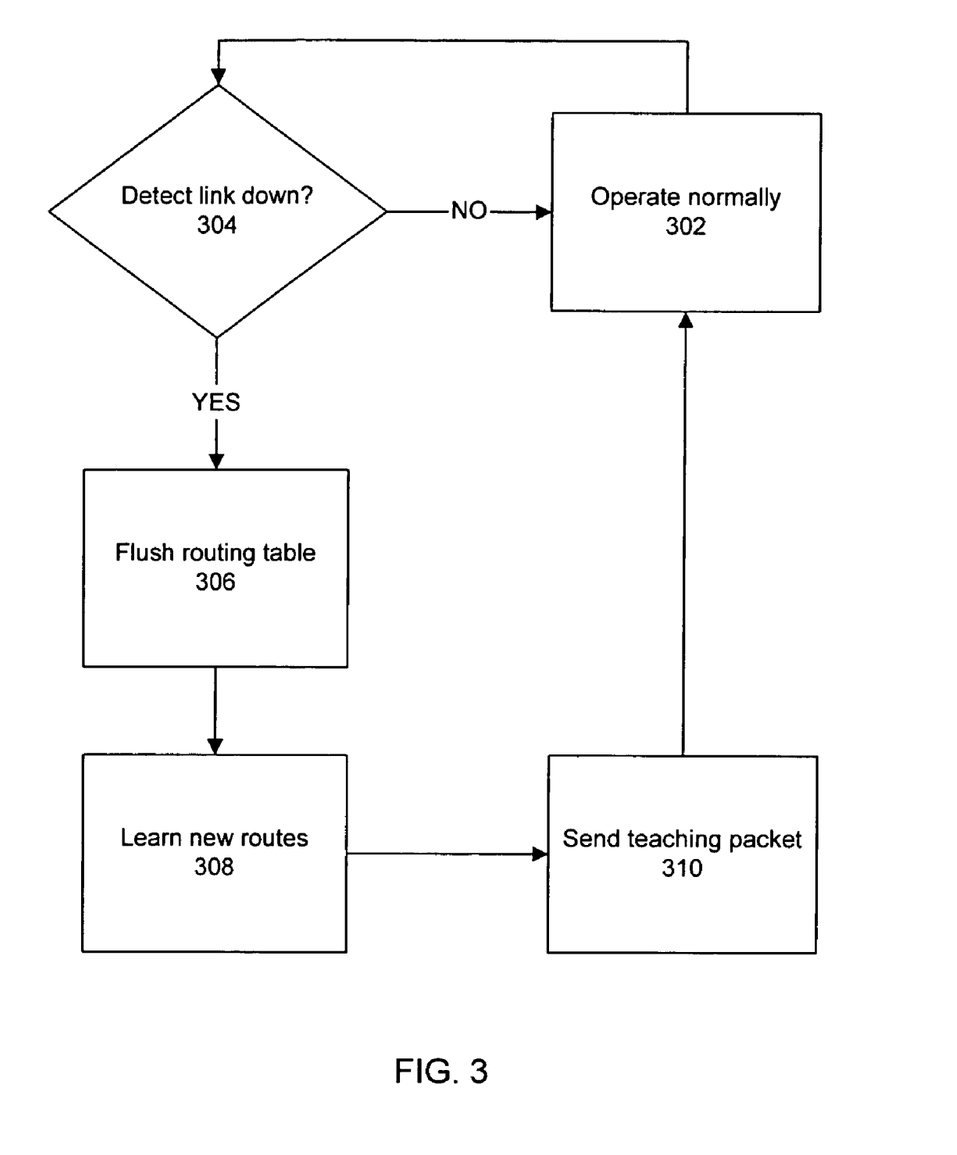
FIG. 3 is a flow chart depicting a method of using the redundant wireless link for fault recovery in accordance with an embodiment of the invention.

Second, it is desired to enable reconfiguration of the network to utilize the wireless link as a backup. FIG. 3 is a flow chart depicting a method of using the redundant wireless link for fault recovery in accordance with an embodiment of the invention. Normal operation (302) of the network may be interrupted by detection (304) of a down link in the network. For example, as illustrated in FIG. 1B, the wired link between switches S6 and S7 may be detected to be down or broken. In response, the detecting switch with the redundant wireless link (switch S7 in the example depicted in FIG. 1B) would be configured to flush (306) its routing table, learn (308) new routes, and send (310) a "teaching packet" that teaches a route across the wireless link.

For example, in the network depicted in FIG. 1A, the switches S7 may be configured with a routing table with entries indicating that packets destined for switches S1 through S6 are to be sent out the exit port on the path from S7 to S6. However, in the situation depicted in FIG. 1B, the link between S7 and S6 is broken. Hence, after flushing its table and learning new routes, switch S1 would send a teaching packet to switch S7 that tells S7 to reply with a packet for S6 across the S1 to S7 wireless path. This teaches S7, and other switches downstream from S7 (not shown), that there is a path to S6 by way of S1. Similarly, S6 is taught that it can find S7 along paths to S1.

Figure 4:
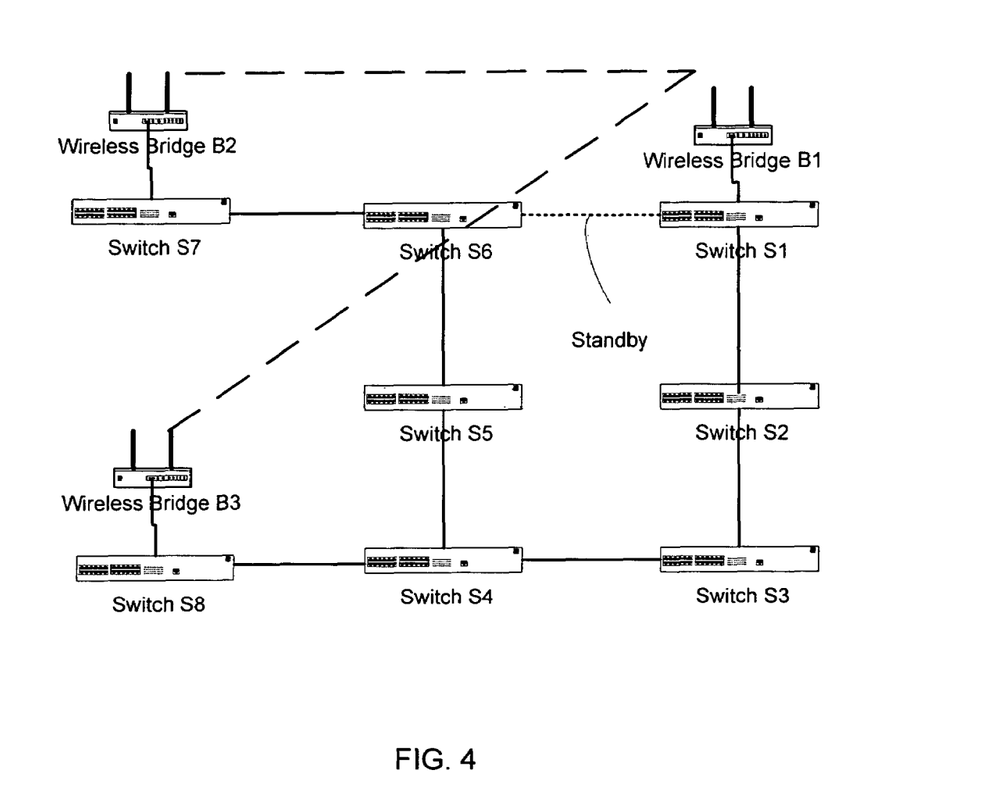
FIG. 4 is a diagram of a network with a point-to-multipoint wireless link for redundancy in accordance with an embodiment of the invention.

FIG. 4 is a diagram of a network with a point-to-multipoint wireless link for redundancy in accordance with an embodiment of the invention. The network illustrated in FIG. 4 is similar to the one illustrated in FIG. 1, with the difference being that the network of FIG. 4 has an additional switch S8. The additional switch S8 is attached to a third wireless bridge unit B3. The third wireless bridge unit B3 forms a second wireless link to the first wireless bridge unit B1. In other words, there is a point-to-multipoint wireless connection from B1 to both B2 and B3.

The above-discussed technique may also be applied to such a network. In other words, the methods of FIG. 2 and FIG. 3 may be applied to both wireless links in FIG. 4.

Figure 5A:
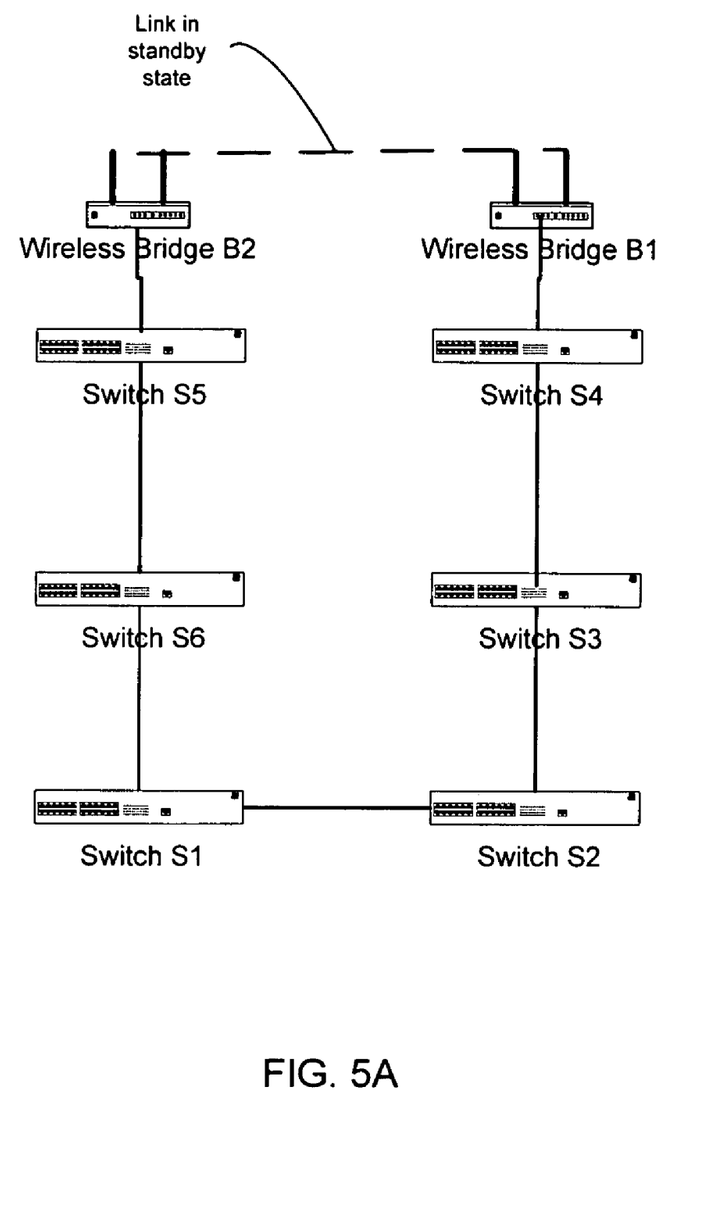
FIGS. 5A and 5B are diagrams depicting a network with a wireless link as part of a network loop topology in accordance with an embodiment of the invention.
Figure 5B:
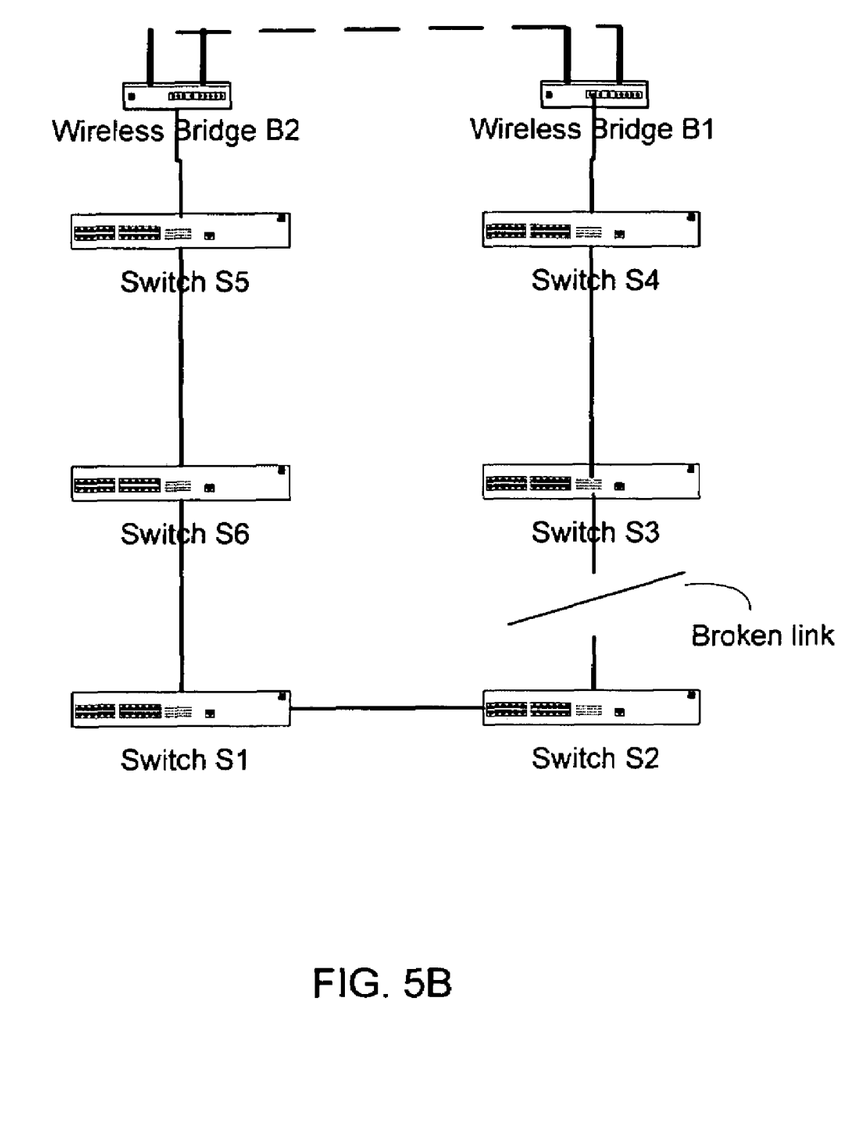

FIGS. 5A and 5B are diagrams depicting a network with a wireless link as part of a network loop topology in accordance with an embodiment of the invention. As shown in FIG. 5A, the example network includes six network switches S1 through S6. Switches along a chain including S5, S6, S1, S2, S3 and S4 are shown interconnected using wired links. In addition, a wireless bridge device B1 is connected to switch S4, and a wireless bridge device B2 is connected to switch S5. A wireless link is formed between these two bridge devices B1 and B2. The wireless link completes a ring topology. In this example, the wireless link is in a standby state to prevent looping.

A situation or circumstances may exist where one of the links between two of the switches is broken or down. For example, as illustrated in FIG. 5B, the wired link between switch S2 and switch S3 may be broken or down.

In that case, switches S2 and S3 may be conventionally configured to detect the broken link and to react accordingly. The detection may occur, for example, due to failure to receive a link signal that is normally periodically transmitted over the link to the port. The conventional reaction under a spanning tree protocol would typically include two actions. A first action involves temporarily reducing the aging time associated with entries in the MAC address table of the switch. The aging time is typically reduced from a normal aging time of about 5 minutes to a forward delay time of perhaps 15 seconds. A second action involves advertising the topology change by sending a topology change notification (TCN) on the switch's root port. Eventually, the root switch receives the TCN, and the root switch sends out bridge PDUs such that each switch in the tree is aware of the topology change situation and temporarily reduces its aging time. Unfortunately, the conventional technique is disadvantageously slow and hence does not provide for rapid response to the link failure.

In accordance with another technique, the switches S in the network may be configured such that ports between the switches behave with link-loss propagation. Such link-loss propagation may be implemented, for example, using a "link-loss-learn" technique. (Other ports may be configured to implement or not implement link-loss propagation behavior.) For example, when a link-loss-learn enabled port detects a link failure, the link-loss-learn port responds by two different actions. One action involves clearing the switch's MAC address table so that the discovery process to fill the table begins immediately. A second action involves the switch temporarily or momentarily dropping links on other link-loss-learn enabled ports. This second action is performed so as to propagate the failure event to other switches in the ring. The link-loss-learn technique is described in U.S. patent application Ser. No. 10/678,977, entitled "LAN Switch with Rapid Fault Recovery," filed on Oct. 3, 2003 by Dileep Sivanasankaran, Frank S. Madren, and Peter R. Wood, the disclosure of which is hereby incorporated by reference. Unfortunately, although the link-loss-learn technique may be used to propagate the link failure, it would not by itself provide for a rapid response to the link failure. This is because the address tables in the conventional wireless bridge units B1 and B2 are not conventionally configured to be flushed. Nor is there any protocol or standard method to flush the bridge units. One advantageous aspect of the technique disclosed herein is that, without specifying the protocol method, the Ethernet devices are instructed to relearn portions of their routing tables.

Figure 6:
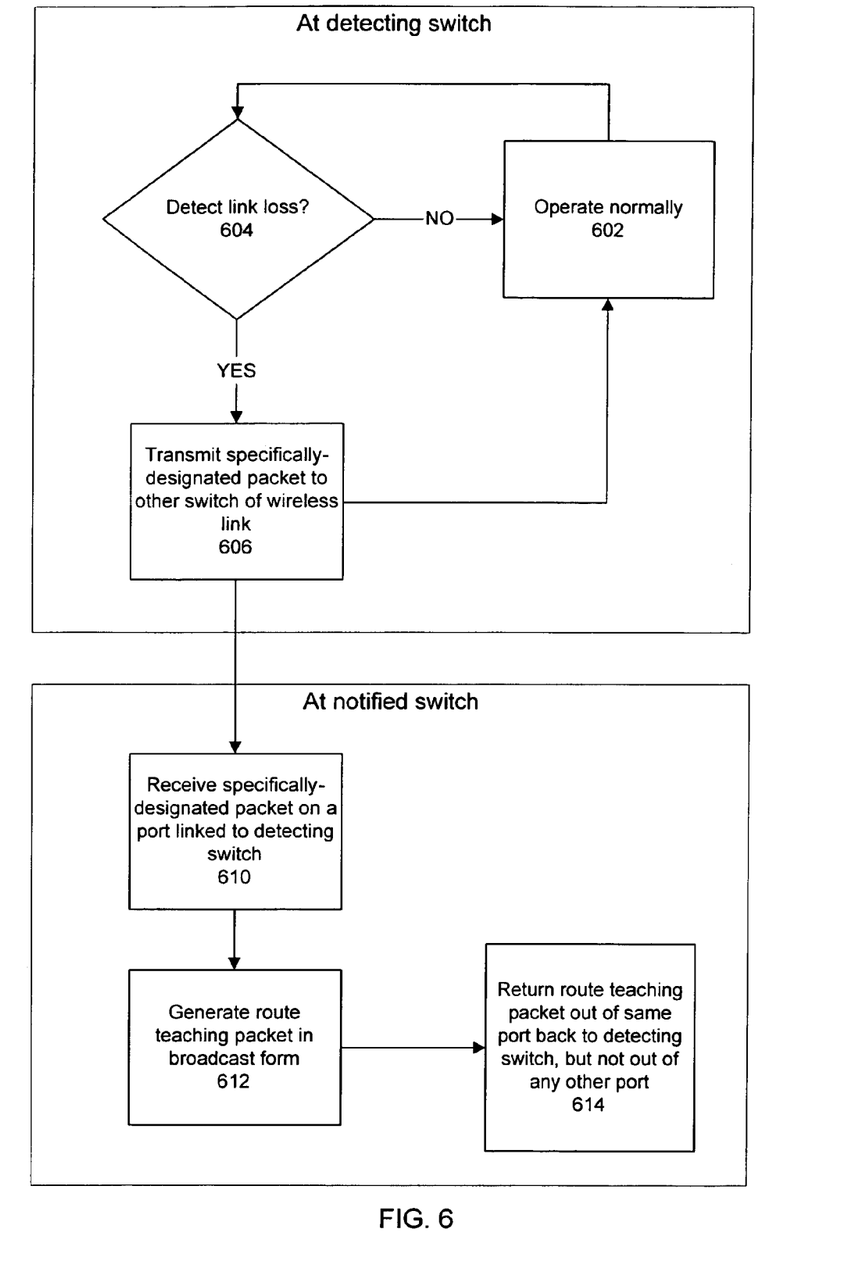
FIG. 6 is a flow chart depicting a method of rapid fault recovery in a network with a wireless link in accordance with an embodiment of the invention.

However, as disclosed herein, the link-loss-learn technique discussed above may be enhanced to respond rapidly even with the wireless link. In particular, by passing packets through the bridge units, then they can learn from these special teaching packets that there is a new route to a destination address and that allows them to discard alternate routes. FIG. 6 is a flow chart depicting a method of rapid fault recovery in a network with a wireless link in accordance with an embodiment of the invention.

Consider, for example, that the link loss propagates from switch S3 to switch S4 in FIG. 5B. Switch S4 thus detects the link loss and may be considered as the "detecting switch" of FIG. 6. The detecting switch may be thought of as operating "normally" (602) until a link loss is detected (604). Upon the link loss detection, the detecting switch is advantageously configured to transmit (606) a specifically-designated packet to the other wireless switch of the wireless link. In FIG. 5B, switch S4 would transmit the specifically-designated packet to switch S5. Switch S5 hence receives (610) the specifically-designated packet on the port linked to the detecting switch and may be considered as the "notified switch" of FIG. 6. The specific designation may be implemented, for example, by the packet having a source address that is a predetermined reserved MAC address. In other words, the packet may comprise a protocol data unit (PDU) with a pre-specified source address. An example of a PDU with a pre-specified source is a GarrettCom PDU (GPDU), as discussed below in relation to FIG. 7.

In response to receiving (610) the specifically-designated packet, the notified switch is advantageously configured to generate (612) a "route teaching" packet (with the same packet structure as the specifically-designated packet, but in broadcast form) and to return (614) this route teaching packet out of the same port back to detecting device, but not out of its other ports. In FIG. 5B, this route teaching packet would go not only to switch S4, but also to switch S3. In one specific implementation, the "route teaching" packet may comprise a GarrettCom PDU with route teaching information embedded therein.

The above-discussed method of FIG. 6 advantageously causes the address tables of the switches receiving the broadcast packet to change. In the example of FIG. 5B, the address table of each of switches S4 and S3 would be instructed to change so that packets destined for one of switches S5, S6, S1 or S2 would be directed to ports along the path from S3 to S4 to S5, instead of ports along the path from S4 to S3 to S2.

The analogous method would also happen from the perspective of the other side of the wireless link. In that perspective, switch S5 would be the detecting switch and switch S4 would be the notified switch. Per this method, the address table of each of switches S5, S6, S1, and S2 would be changed so that packets destined for one of switches S4 or S3 would be directed to ports along the path from S2 to S1 to S6 to S5 to S4, instead of ports along the path from S5 to S6 to S1 to S2 to S3.

In alternate embodiments, the method discussed above in relation to FIG. 6 may also be applied beyond wireless links to point-to-point links more generally. For example, the point-to-point link may comprise PPOE (PPP over Ethernet) or another type of point-to-point link.

Figure 7:
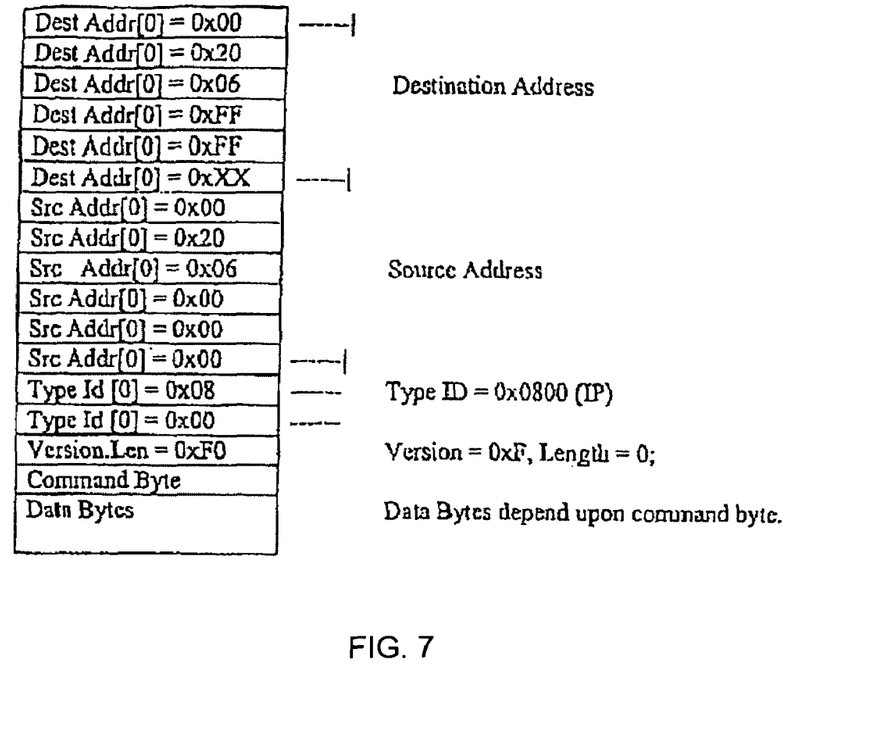
FIG. 7 is a diagram depicting a structure of a GarrettCom PDU in accordance with a specific embodiment of the invention.

FIG. 7 is a diagram depicting a structure of a GarrettCom PDU (GPDU) in accordance with a specific embodiment of the invention. A GPDU is a specific implementation of a PDU with a pre-specified source address. As used by certain GarrettCom switches, GPDUs are special data packets exchanged between switches to communicate various information about the physical layer media associated with the switches. Media characteristics such as type, speed, duplex status, and events such as link loss, may be communicated using GPDUs. GPDUs utilize a pre-assigned block of MAC addresses from the Organizationally Unique Id (OUI) bock assigned to Garrettcom Inc.

GPDUs use the MAC address block 00:20:06:FF:FF:00 to 00:20:06:FF:FF:FF as the destination address and 00:20:06:00:00:00 as the source address. GarrettCom has reserved these addresses for this purpose so they will not be used for other purposes. GPDUs use the same packet structure as IP packets. They use the same frame type identifier (0800), but use 0xF as version and '0' as length. This ensures that any device receiving the GPDU packet without knowledge of the PSS PDU or GPDU protocol will simply ignore the packet. Furthermore, since these packets conform to existing Internet (IETF) standards, unlike proprietary packets, these packets are transparently passed along by all standard-conforming Ethernet devices.

Figure 8:
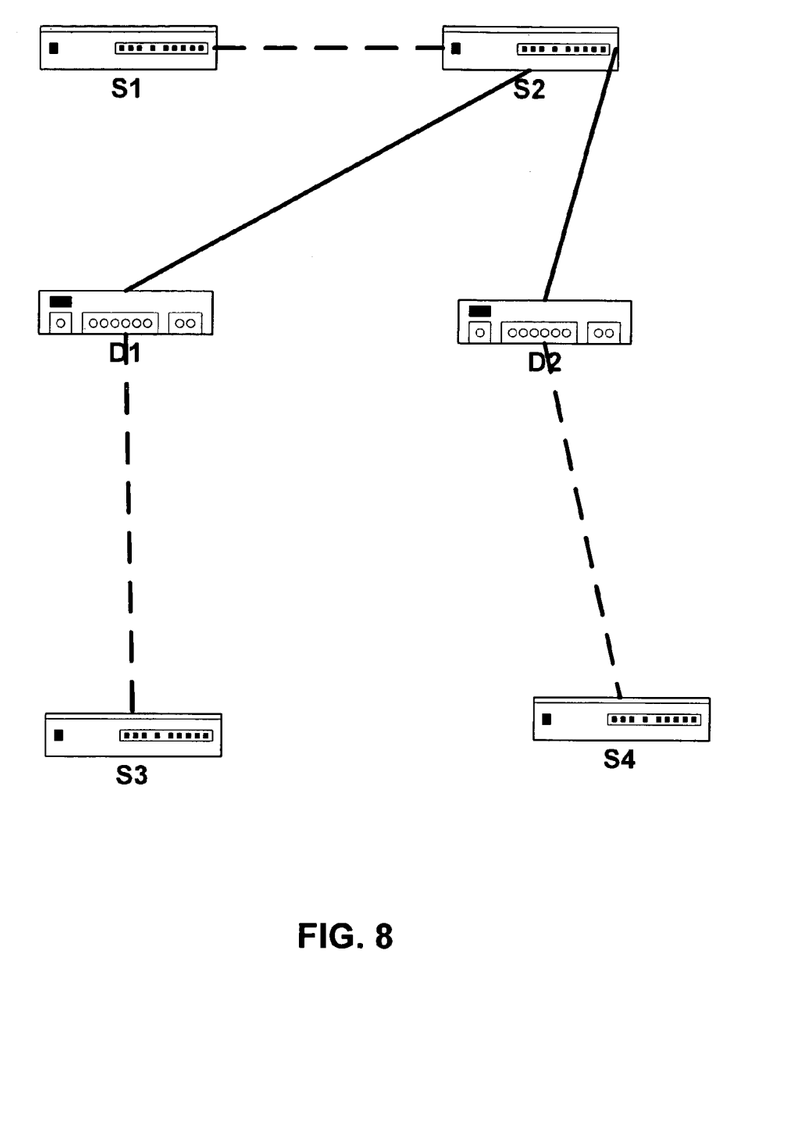
FIG. 8 is a diagram of a network with three point-to-point links used to illustrate the detection of neighbor devices across a point-to-point link in accordance with an embodiment of the invention.
Figure 9:
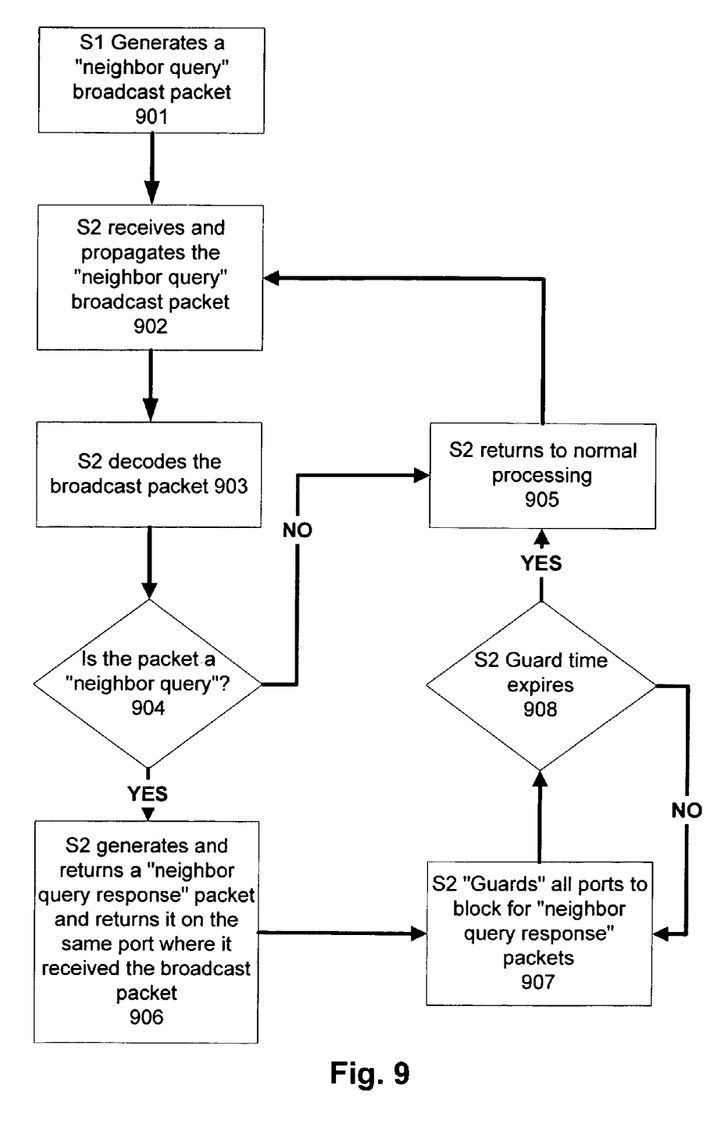
FIG. 9 is a flow chart depicting a method of detecting neighbor devices across a point-to-point link in accordance with an embodiment of the invention.

FIG. 8 illustrates a network where multiple devices may have neighbors that are connected by point-to-point links (as indicated by dashed lines) in accordance with an embodiment of the invention. FIG. 9 is a flow diagram of the neighbor discovery method in accordance with an embodiment of the invention. In order for switch S1 to determine the identity of its neighbor on the point-to-point link, S1 will generate a GPDU packet that is designated as a "neighbor query" broadcast packet (901) and sends it out the port connecting S1 to S2. Since this is a broadcast packet, this packet will propagate past S2 (902) and on to S3 and S4 which will also attempt to respond with a "neighbor query response". To avoid confusion on the part of S1, S2 performs a very special action. S2 sends a "neighbor query response" (906) packet to S1 and then filters all "neighbor query response packets" (907) that return on its other ports for a "guard time" (908) to insure that S1 receives only a single query response.

While an embodiment of the invention is described above in relation to Ethernet devices, this technology and method, although designed for Ethernet devices and protocols, may be implemented using other networking technologies, such as WAN, SAN, ATM, and so on.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A network device comprising:
a plurality of ports, including at least a first port configured to form a primary link via a primary connection to a first other device and a second port configured to form a point-to-point wireless link to a second other device; and
a management module configured to periodically transmit a keep-alive control packet over the point-to-point wireless link to the second other device and to detect whether the primary link is indicated to be down,
wherein the management module is further configured such that when the primary link is indicated to be down, then the network device flushes its routing table, learns new routes, sends a specifically-designated packet over the point-to-point wireless link to the second other device, and receives in return a route teaching packet in broadcast form over the point-to-point wireless link from the second other device, and
wherein each route teaching packet instructs devices to change their address tables such that certain packets follow a path through the point-to-point wireless link.

2. The network device of claim 1, wherein the keep-alive control packet is transmitted at a periodicity less than a stay-alive time of the point-to-point wireless link.

3. The network device of claim 2, wherein the keep-alive packet prevents automatic timeout or teardown of the point-to-point wireless link.

4. The network device of claim 1, wherein the primary link comprises a wired link.

5. The network device of claim 4, wherein the network device comprises an Ethernet switch which is coupled to a wireless bridge for the wireless link.

6. A method of operating a network device to provide redundancy in a network, the network device comprising a plurality of ports, wherein the plurality of ports includes at least a first port configured to form a primary link to a first other network device and a second port configured to form a point-to-point wireless link to a second other network device, the method comprising periodically transmitting a keep-alive control packet over the point-to-point wireless link to the second other network device, detecting whether the primary link is indicated to be down, and when the primary link is indicated to be down, then flushing a routing table of the network device, learning new routes, sending a specifically-designated packet over the point-to-point wireless link to the second other network device, and receiving in return a route teaching packet in broadcast form from the second other device over the point-to-point wireless link, wherein each said route teaching packet instructs other network devices to change their address tables such that certain packets will follow a path through the point-to-point wireless link.

7. The method of claim 6, wherein the keep-alive control packet is transmitted at a periodicity less than a stay-alive time of the point-to-point wireless link.

8. The method of claim 7, wherein the keep-alive packet prevents automatic timeout or teardown of the point-to-point wireless link.

9. The method of claim 6, wherein the primary link comprises a wired link.

10. The method of claim 9, wherein the network device comprises an Ethernet switch which is coupled to a wireless bridge for the wireless link.

* * * * *